United States Patent
Pathirane et al.

(10) Patent No.: US 8,055,888 B2
(45) Date of Patent: Nov. 8, 2011

(54) INITIALISATION OF A PIPELINED PROCESSOR

(75) Inventors: Chiloda Ashan Senerath Pathirane, Haverhill (GB); David Michael Gilday, Cambridgeshire (GB)

(73) Assignee: ARM Limited, Cambridge (GB)

( * ) Notice: Subject to any disclaimer, the term of this patent is extended or adjusted under 35 U.S.C. 154(b) by 804 days.

(21) Appl. No.: 12/073,049

(22) Filed: Feb. 28, 2008

(65) Prior Publication Data

US 2009/0222649 A1 Sep. 3, 2009

(51) Int. Cl.
*G06F 9/00* (2006.01)
*G06F 7/38* (2006.01)
*G06F 15/00* (2006.01)

(52) U.S. Cl. .......... 713/1; 713/2; 708/233; 712/2; 712/32

(58) Field of Classification Search .......... 713/2, 1; 708/233; 712/2, 32
See application file for complete search history.

(56) References Cited

U.S. PATENT DOCUMENTS

| | | | |
|---|---|---|---|
| 6,609,209 B1* | 8/2003 | Tiwari et al. | 713/322 |
| 6,665,795 B1* | 12/2003 | Roth et al. | 713/1 |
| 7,383,426 B2* | 6/2008 | Chung et al. | 712/220 |
| 7,818,699 B1* | 10/2010 | Stuber et al. | 716/123 |
| 7,849,288 B2* | 12/2010 | Fujisawa et al. | 712/15 |

* cited by examiner

*Primary Examiner* — Stefan Stoynov
(74) *Attorney, Agent, or Firm* — Nixon & Vanderhye, P.C.

(57) ABSTRACT

A data processing apparatus is disclosed that comprises a pipelined processor, said pipelined processor comprising a processing pipeline for processing instructions in a plurality of stages, at least some of said plurality of stages each comprising storage elements for storing an instruction or decoded instruction being processed in said stage, said storage elements in at least one of said stages comprising settable elements, each of said settable elements being adapted to store a predetermined value in response to a wake up event, said settable elements being arranged such that in response to said wake up event said values stored in said settable elements form an instruction or decoded instruction.

21 Claims, 4 Drawing Sheets

INITIALISATION OF A PIPELINED PROCESSOR

BACKGROUND OF THE INVENTION

1. Field of the Invention

The field of the invention relates to data processing and in particular to the initialisation of a pipelined processor.

2. Description of the Prior Art

On switch on the state of some elements within a processor may need to be set to enable the processor to function as expected. For example, there may be certain behaviour that the programmers' model of the processor predicts will not happen unless certain values are stored in particular registers at start up. Thus, some sort of initialisation or boot-up routine may be required to ensure correct behaviour. This may also be the case following other events such as an interrupt or reset.

A known way of providing a processor hardware boot-up sequence is to have a state machine within the processor that forces micro code down the core pipeline to achieve the desired initialisation effects. A drawback of this is the need to provide the state machine and store the micro code. Furthermore, the instructions or micro code need to be loaded into the pipeline and progress down it to be executed which takes time and adds a delay to the processor being ready. Additionally, the values stored at start up in instruction registers within the pipeline will be clocked through the pipeline ahead of the loaded code. Thus, there is the additional task of ensuring that they do not generate any undesired operations.

SUMMARY OF THE INVENTION

A first aspect of the present invention provides a data processing apparatus comprising a pipelined processor, said pipelined processor comprising a processing pipeline for processing instructions in a plurality of stages, at least some of said plurality of stages each comprising storage elements for storing an instruction or decoded instruction being processed in said stage, said storage elements in at least one of said stages comprising settable elements, each of said settable elements being adapted to store a particular predetermined value in response to a wake up event, said settable elements being arranged such that in response to said wake up event said predetermined values stored in said settable elements form an instruction or decoded instruction.

The present invention provides a way of effectively preloading instructions or decoded instructions into a pipeline in response to a wake up event. This is done by simply providing settable elements as the instruction or decoded instruction storage elements in at least one of the stages in the pipeline. These elements store particular known values in response to this wake up event. The use of settable elements that store known values in response to a wake up event, means that by the selection of appropriate elements, a desired sequence of values can be stored in these elements in response to the wake up event. Thus, by selection of appropriate elements in a stage of the pipeline an instruction or decoded instruction can automatically be stored in that stage in response to a single wake up event. This means that in effect at least one instruction or decoded instruction is preloaded into the pipeline following the wake up event and this can then be executed. This has the advantage of the instruction being within the pipeline immediately following a wake up event and this saves timing cycles compared to loading the instruction into the pipeline following this event.

It should be noted that settable storage elements may take up more area than storage elements whose value in response to a wake up event is indeterminate and for this reason there is generally a technical prejudice against using them for elements such as instruction registers, however, in this particular instance the timing advantages and the possibility to avoid using a state machine that may otherwise be needed to load in state following a wake up event may make the additional area worthwhile.

Embodiments of the present invention can be configured to respond to any asynchronous event or synchronous reset for which some pre-defined behaviour (which is typically carried out using a micro-code state machine) needs to be guaranteed. For example, the wake up event could be an interrupt with the settable elements performing automated stacking of context.

In some embodiments said wake up event comprises a reset signal. Although the reset signal can be a synchronous reset signal in some embodiments it is an asynchronous reset signal.

In some embodiments, said data processing apparatus is adapted to generate the reset signal in response to power up.

Although, the reset signal may be generated in a number of ways, in some embodiments it is generated in response to power up. The generation of the signal at power up means that the preloaded instructions can be instructions to perform at least a part of an initialisation sequence. Thus, depending on the initialisation requirements it may be possible to perform the initialisation routine using the preloaded instruction(s) and thereby dispense with a conventional hardware boot-up sequence completely. Alternatively, it should at the very least allow the implementation of at least a part of the sequence thereby reducing the amount of hardware and timing cycles required to perform the rest of the sequence.

In some embodiments said data processing apparatus is adapted to generate the reset signal in response to a software routine.

Alternatively, the reset signal may be software generated. It is desirable to enable a data processing apparatus to be reset on command. In such cases, some sort of initialisation routine may be needed following reset and providing storage elements within the pipeline that are settable elements and store predetermined values in response to the reset signal enables this to be performed efficiently.

In some embodiments, said reset signal comprises a signal to power on said data processing apparatus, said settable elements being adapted to store said predetermined value in response to powering up.

It may be that the reset signal is a power on signal and the settable elements are elements that store predetermined values on powering up. In such a case, a software generated reset signal may involve a power down and power up signal sent to the settable elements.

In some embodiments, said storage elements in a plurality of said stages comprise settable elements, said settable elements being arranged to store an instruction or decoded instruction in each of said respective plurality of stages in response to said wake up event.

It may be advantageous for storage elements in a plurality of the stages to comprise settable elements so that a corresponding plurality of instructions or decoded instructions can be stored. The number of instructions that it is desirable to pre-load in this way depends on what they are required to perform. For example, if they are initialization instructions then it depends on the complexity of the initialization routine that is required. The number of instructions that a pipeline can store depends on the length of the pipeline. Some pipelines comprise multiple stages and in such cases multiple instructions can be preloaded in this way provided the instruction storage elements within these stages are formed from these settable elements.

In some embodiments, said at least one stored instruction or decoded instruction is for controlling said data processing apparatus to perform an initialisation operation on execution.

Although the stored instructions may be for performing a number of different tasks, they are particularly useful for controlling said data processing apparatus to perform initialisation operations on execution.

Although the settable elements can be formed from any device that has the property that in response to a wake up event they store a predetermined value, in some embodiments they comprise reset flops.

In some embodiments, said data processing apparatus comprises a data processing apparatus formed from field programmable gate array FPGA fabric.

Data processing apparatus formed from FPGA fabric have storage elements of similar area whether they are settable elements that store known values on reset or more conventional non-settable storage elements that store unknown values on reset. Thus, in data processing apparatus formed from this fabric the preloading of instruction(s) into the pipeline on reset can in effect be achieved with very little or no additional area overhead.

In some embodiments, said data processing apparatus further comprises a random access memory (RAM) and said at least one stage of said pipeline comprises settable elements arranged to store an instruction or decoded instruction in response to said wake up event, said instruction or decoded instruction being for writing to a location within said RAM, said location being adapted to store a stack pointer.

Stack pointers are in many processing apparatus word sized and in order for them to be word aligned, on many devices the register that stores the stack pointers are manufactured to be word sized in other words they are manufactured to have two fewer bits than a conventional register. In FPGA devices where a RAM is used to store the stack pointers this solution to the word alignment problem can not be used. Thus, in order to guarantee word alignment, processing apparatus made from FPGA fabric have been designed to always force the two lowest bits of the stack pointer storage location to zero when writing to this location. However, on initialisation before this location has been written to there is no guarantee that there are zero's stored in these locations and this can cause problems. This potential problem can be solved by an embodiment of the invention by using appropriate settable elements in at least one stage of the pipeline processor such that on reset an instruction that writes to the stack pointer is in effect preloaded in the pipeline. This instruction will therefore be executed following start up and this will force the two lowest bits in the stack pointer to zero as any write to this location guarantees this behaviour. This solves the problem without creating any timing critical paths in the design and without expending significant area.

In some embodiments, said processor pipeline comprises three stages, a fetch stage, a decode stage and an execution stage, said decode and execution stages comprising settable elements arranged to store an instruction and decoded instruction respectively in response to said reset signal, said instruction and decoded instruction being instructions to write to different stack pointers.

Embodiments of this invention are particularly advantageous with three stage pipelines on FPGA fabric that have two stack pointers within the RAM. In such a case, providing the appropriate settable elements in the last two stages of the pipeline that is the execute and decode stage means that an instruction and decoded instruction respectively are stored automatically on reset, thereby allowing the two stack pointers to be word aligned once these two instructions have been executed. Pre-loading them into the final portions of the pipeline is efficient from a timing perspective.

In some embodiments, said storage elements within at least one of said stages comprise elements of a register.

The storage elements within the different pipeline stages may take a number of forms but may often be registers.

A further aspect of the present invention provides a method of resetting a data processing apparatus in response to a wake up event, said data processing apparatus comprising a processing pipeline, said processing pipeline comprising a plurality of stages through which instructions progress as they are processed, at least some of said plurality of stages comprising storage elements for storing said instructions or decoded instructions, said storage elements in at least one of said stages comprising settable elements adapted to hold predetermined values in response to said wake up event, said predetermined values forming an instruction or decoded instruction; said method comprising the steps of generating said wake up event; in response to said wake up event, said at least one stage comprising settable elements storing said predetermined values forming said instruction or decoded instruction; executing said at least one stored instruction or decoded instruction.

A yet further aspect of the invention provides a means for processing data comprising a pipelined processing means for processing instructions in a plurality of stages, at least some of said plurality of stages each comprising storage means for storing an instruction or decoded instruction being processed in said stage, said storage means in at least one of said stages comprising a plurality of settable means each for storing a particular predetermined value in response to a wake up event, said settable means being arranged such that in response to said wake up event said predetermined values stored in said settable means form an instruction or decoded instruction.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
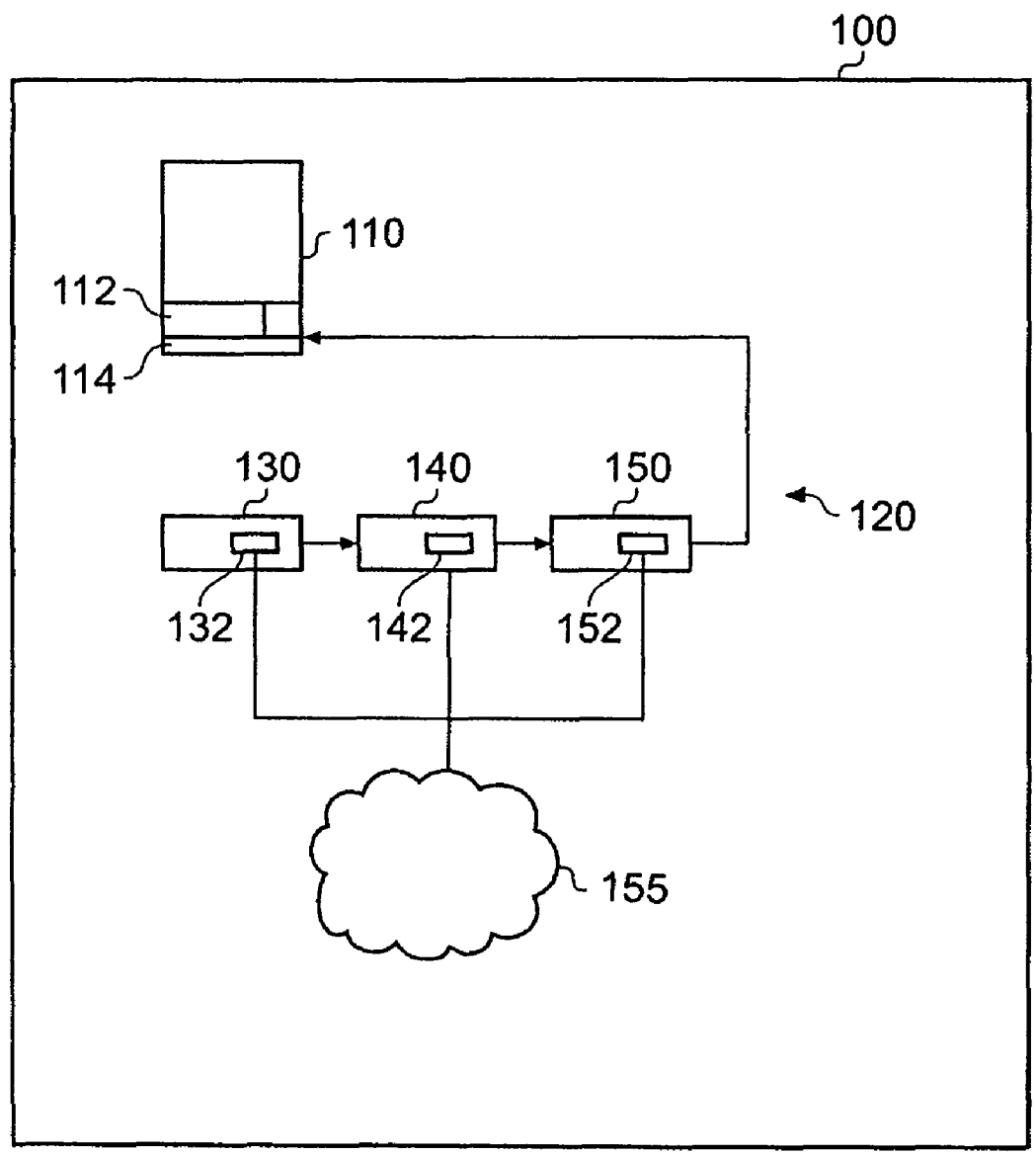
FIG. 1 schematically shows a pipelined processor according to an embodiment of the present invention.

FIG. 1 shows a data processing apparatus 100 made from a field programmable gate array FPGA fabric. In this data processing apparatus a register bank 110 which consists of the architectural registers available in the programmers' model is implemented as a block of RAM 110. This block of RAM 110 comprises storage locations 112, 114 dedicated to storing two stack pointers. In order to ensure that these stack pointers are word aligned, generally when they are implemented as registers the hardware is designed such that the registers only have 30 bits of actual register (bits [31:2]) with bits [1:0] always reading as zero as this ensures word alignment for values pushed onto the stack. It should be noted that it is not that these bits are absent it is just that as they are always zero they can just be wires tied to 0 as opposed to actual register bits. In this case, the registers are implemented cheaply in blocks of RAM and thus, it is no longer so straightforward to use hardware to ensure that these two bits are always zero. In order to address this problem the behaviour of data processing apparatus 100 is arranged so that these two bits are always forced to zero whenever a value is written to either of the stack pointers 112 or 114. However, on initialisation no values have been written to the stack pointers and thus RAM 110 may store ones in some or all of these locations. It should be noted that although it would be possible to add some logic to always read these bits as zero, by for example some multiplexing on the read port of the register RAM, this path is very timing critical and thus, extra logic on this path should be avoided where possible.

Data processing apparatus 100 comprises a pipeline processor 120 with a fetch stage 130 a decode stage 140 and an execution stage 150. An instruction that is fetched in instruction fetch stage 130 is stored in the storage elements 132. An instruction to be decoded in decode stage 140 is stored in the storage elements 142 and the control signals produced from the decode instruction to be executed by execution stage 150 are stored in execution stage 150 in storage elements 152. In order to address the problems of the lower two bits of stack pointers 112 and 114 having indeterminant values on start up or following reset, this embodiment of the present invention forms storage elements 142 and 152 with reset flops arranged such that on receipt of a reset signal such as might provoke power up, the value stored in the reset flops emulate an instruction to write to one of the stack pointers and the value stored in storage elements 152 emulate a control signals to write to the other stack pointer. Thus, on power up instructions to write to these stack pointers are in effect already loaded in pipeline 120 and they can then be executed in the first few clock cycles following start up.

Following execution of these pre-loaded instructions, the two locations 112, 114 will have been written to and once this has happened the lower two bits of these locations are forced to zero (the data processing apparatus is set up to guarantee this behaviour) and thus, acceptable values are now stored within the stack pointers and this part of data processing apparatus 100 is correctly initialised.

Data processing apparatus 100 further comprises control logic 155 for generating an asynchronous reset signal that triggers the setting of storage elements 132, 142, 152 in response to certain conditions. These may be power up, a request from a user or a particular predetermined event such as a request from a debug agent (to, for example, re-start execution at the start of a program after a debug session is complete) or a request from a watchdog timer on detection of an unrecoverable error condition. It may also be some other asynchronous wake up event.

The settable elements forming the instruction or control signal registers within at least some of the stages of the pipeline are arranged such that they automatically store instructions or decoded instructions required for an initialisation routine following receipt of the reset signal. This enables the initialisation routine to be performed with minimal time delay and requiring little power consumption following reset as the instructions are already preloaded within the instruction pipeline.

The skilled person would appreciate that although FIG. 1 shows a simple pipeline with only three stages, it would be appreciated that the present technique is applicable to both simpler and more complex pipelines. For example, a pipeline might have multiple decode and execution stages with a plurality of registers so that several instructions can be stored in these stages in response to a wake up signal. Furthermore, each stage may store multiple instructions, in the case, for example of a multi-issue processor that is capable of executing more than one instruction at a time. In such a case there may be multiple settable elements 132, 142, 152 within the stages operable to store multiple instructions or decoded instructions for an initialisation routine.

Figure 2:
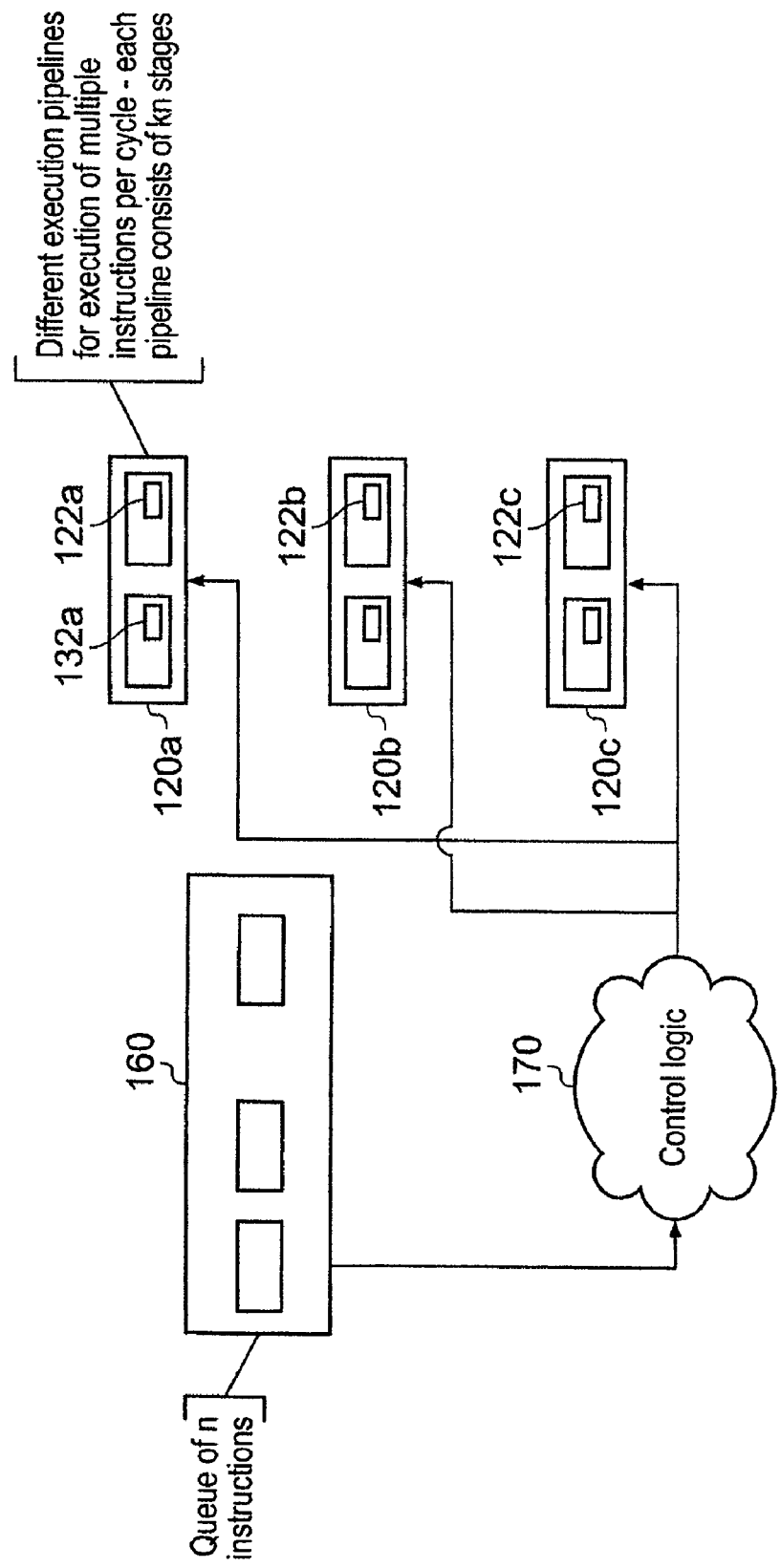
FIG. 2 shows a multiple pipelined processor according to an embodiment of the present invention.

FIG. 2 schematically shows a multiprocessor similar to the single processor data processing apparatus of FIG. 1. In this apparatus a queue of instructions 160 are sent to different pipelined processors 120a, 120b, 120c by control logic 170. These instructions or decoded control signals are held within each of the different stages of the pipelines in registers. Some of these registers comprise settable storage elements 122a, 122b, 122c, 132a and these are arranged such that they automatically store instructions or decoded instructions required for an initialisation routine following receipt of a reset signal. This enables the initialisation routine to be performed with minimal time delay and requiring little power consumption following reset as the instructions are already preloaded within the multiple instruction pipelines.

Figure 3A:
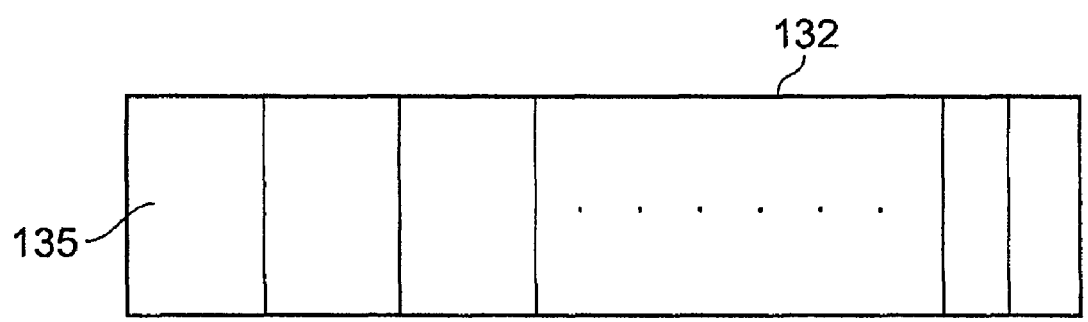
FIG. 3a shows an instruction register formed of settable elements.

FIG. 3a schematically shows an instruction register 132 for storing an instruction within a stage of the pipeline. This instruction register is formed from settable elements 135 which in this case are reset flip flops, these are elements that store either a 0 or a 1 in response to a reset signal. They are selected such that in response to a reset a predetermined instruction is stored in register 132.

Figure 3B:
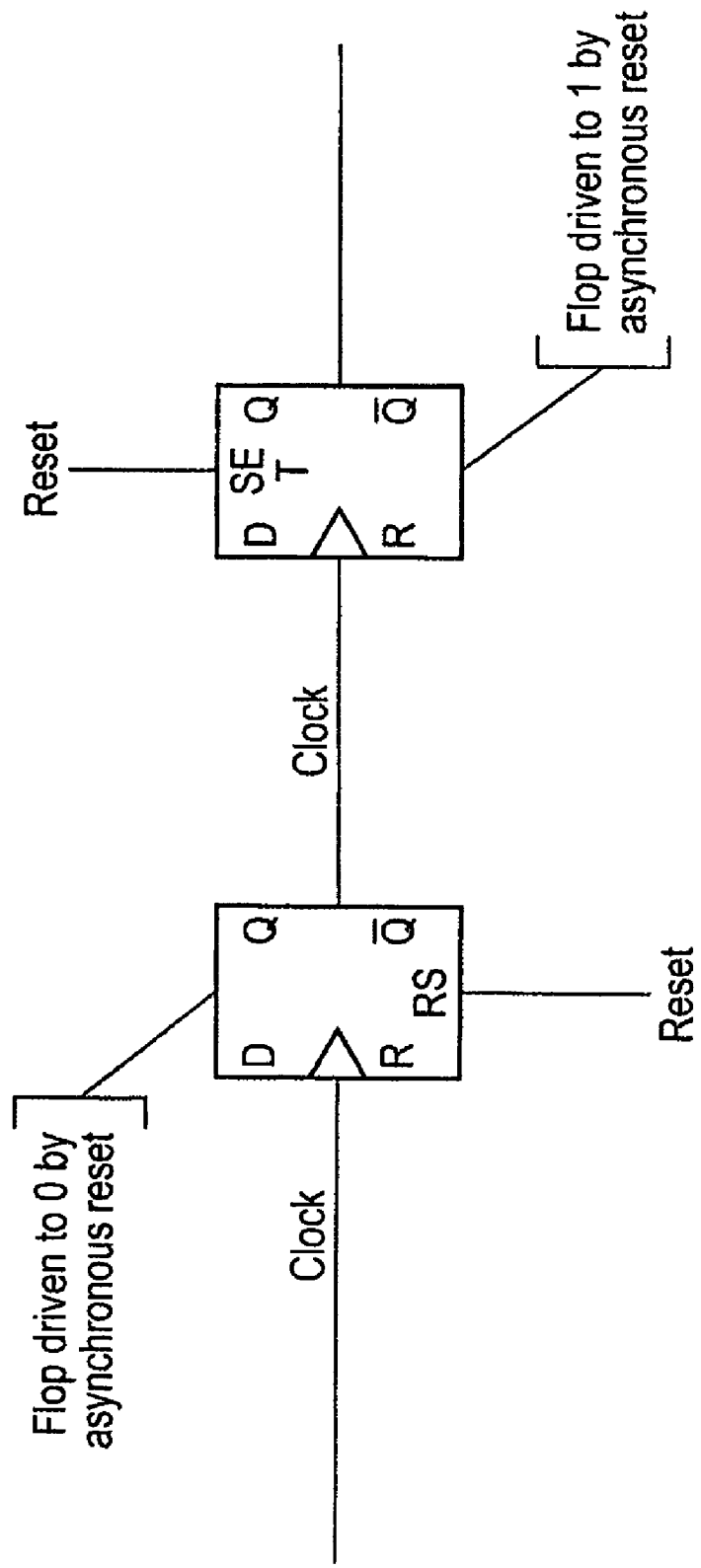
FIG. 3b shows reset flip flops, one configured to store a 1 in response to a reset signal and one configured to store a 0 in response to a reset signal.

FIG. 3b shows two reset flip flops one configured to store a 1 in response to a reset signal and the other a 0. Instruction register 132 is formed from a combination of these elements.

It should be noted that although an instruction register is shown in FIG. 3a, in some stages of the pipeline following decode the registers store decoded control signals rather than instructions. These registers are formed from settable elements in the same way as the ones that store instructions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising a pipelined processor, said pipelined processor comprising a processing pipeline for processing instructions in a plurality of stages, at least some of said plurality of stages each comprising storage elements for storing an instruction or decoded instruction being processed in said stage, said storage elements in at least one of said stages comprising settable elements, each of said settable elements being adapted to store a particular predetermined value in response to a wake up event, said settable elements being arranged such that in response to said wake up event said predetermined values stored in said settable elements form an instruction or decoded instruction.

2. The data processing apparatus according to claim 1, wherein said wake up event comprises a reset signal.

3. The data processing apparatus according to claim 1, wherein said reset signal comprises an asynchronous reset signal.

4. The data processing apparatus according to claim 2, said data processing apparatus being adapted to generate said reset signal in response to power up.

5. The data processing apparatus according to claim 2, said data processing apparatus being adapted to generate said reset signal in response to a software routine.

6. The data processing apparatus according to claim 2, wherein said reset signal comprises a signal to power on said data processing apparatus, said settable elements being adapted to store said predetermined value in response to powering up.

7. The data processing apparatus according to claim 2, wherein said storage elements in a plurality of said stages comprise settable elements, said settable elements being arranged to store an instruction or decoded instruction in each of said respective plurality of stages in response to said reset signal.

8. The data processing apparatus according to claim 2, wherein said at least one stored instruction or decoded instruction is for controlling said data processing apparatus to perform an initialisation operation on execution.

9. The data processing apparatus according to claim 6, wherein said plurality of stored instructions or decoded instructions are for controlling said data processing apparatus to perform a sequence of initialisation operations on execution.

10. The data processing apparatus according to claim 2, wherein said settable elements comprise reset flops.

11. The data processing apparatus according to claim 2, wherein said data processing apparatus comprises a data processing apparatus formed from field programmable gate array FPGA fabric.

12. The data processing apparatus according to claim 11, said data processing apparatus further comprising a random access memory RAM, and said at least one stage of said pipeline comprising settable elements arranged to store an instruction or decoded instruction for writing to a location within said RAM for storing a stack pointer in response to said reset signal.

13. The data processing apparatus according to claim 11, wherein said processor pipeline comprises three stages, a fetch stage, a decode stage and an execution stage, said decode and execution stages comprising settable elements arranged to store an instruction and decoded instruction respectively in response to said wake up event, said instruction and decoded instruction being instructions to write to different stack pointers.

14. The data processing apparatus according to claim 1, wherein said storage elements within at least one of said stages comprise elements of a register.

15. A method of resetting a data processing apparatus in response to a wake up event, said data processing apparatus comprising a processing pipeline, said processing pipeline comprising a plurality of stages through which instructions progress as they are processed, at least some of said plurality of stages comprising storage elements for storing said instructions or decoded instructions, said storage elements in at least one of said stages comprising settable elements adapted to hold predetermined values in response to said wake up event, said predetermined values forming an instruction or decoded instruction; said method comprising the steps of:
generating said wake up event;
in response to said wake up event, said at least one stage comprising settable elements storing said predetermined values forming said instruction or decoded instruction;
executing said at least one stored instruction or decoded instruction.

16. The method according to claim 15, wherein said wake up event comprises a reset signal.

17. The method according to claim 16, wherein said step of generating said reset signal comprises generating a reset signal in response to powering up said data processing apparatus.

18. The method according to claim 16, wherein said storage elements in a plurality of said stages comprise settable elements for storing predetermined values in response to said reset signal, said settable elements being such that a plurality of instructions or decoded instructions are stored in respective ones of said plurality of stages in response to said reset signal, said plurality of instructions or decoded instruction forming an initialisation routine, said step of executing said plurality of stored instructions or decoded instructions comprising performing said initialisation routine.

19. The method according to claim 16, wherein said step of generating said reset signal comprises generating said reset signal in response to a software routine.

20. A means for processing data comprising a pipelined processing means for processing instructions in a plurality of stages, at least some of said plurality of stages each comprising storage means for storing an instruction or decoded instruction being processed in said stage, said storage means in at least one of said stages comprising a plurality of settable means each for storing a particular predetermined value in response to a wake up event, said settable means being arranged such that in response to said wake up event said predetermined values stored in said settable means form an instruction or decoded instruction.

21. The means for processing data according to claim 20, wherein said wake up event comprises a reset signal.

* * * * *